US010976999B1

(12) United States Patent
Browy (10) Patent No.: US 10,976,999 B1
(45) Date of Patent: Apr. 13, 2021

(54) MIXED REALITY SENSOR SUITE AND INTERFACE FOR PHYSICAL REGION ENHANCEMENT

(71) Applicant: Chosen Realities, LLC, Plantation, FL (US)

(72) Inventor: Eric Browy, Coral Springs, FL (US)

(73) Assignee: Chosen Realities, LLC, Plantation, FL (US)

( * ) Notice: Subject to any disclaimer, the term of this patent is extended or adjusted under 35 U.S.C. 154(b) by 0 days.

(21) Appl. No.: 16/443,568

(22) Filed: Jun. 17, 2019

Related U.S. Application Data

(60) Provisional application No. 62/685,841, filed on Jun. 15, 2018.

(51) Int. Cl.
| | |
|---|---|
| *G06F 3/16* | (2006.01) |
| *G06T 19/00* | (2011.01) |
| *H04R 1/40* | (2006.01) |
| *H04R 3/00* | (2006.01) |
| *G02B 27/01* | (2006.01) |

(52) U.S. Cl.
CPC ............ *G06F 3/167* (2013.01); *G06T 19/006* (2013.01); *H04R 1/406* (2013.01); *H04R 3/005* (2013.01); *G02B 27/0172* (2013.01)

(58) Field of Classification Search
CPC ....... G06F 3/167; G06T 19/006; H04R 1/406; H04R 3/005; G02B 27/0172
See application file for complete search history.

(56) References Cited

U.S. PATENT DOCUMENTS

| 9,754,167 | B1* | 9/2017 | Holz ................... G06K 9/00355 |
| 2016/0142830 | A1* | 5/2016 | Hu ........................... G10L 21/14 |
| | | | 434/185 |
| 2018/0033206 | A1* | 2/2018 | Han ..................... G06F 3/04815 |
| 2018/0157044 | A1* | 6/2018 | Choi ....................... H04N 13/30 |
| 2019/0362557 | A1* | 11/2019 | Lacey ................... G06T 19/006 |

* cited by examiner

*Primary Examiner* — Afroza Chowdhury
(74) *Attorney, Agent, or Firm* — Vista IP Law Group, LLP (57) ABSTRACT

Disclosed herein is a mixed reality application to use a multi-channel audio input to identify a character and origin of a given sound, then present a visual representation of the given sound on a near eye display. The visual representation including a vector to the source of the sound. The visual representation further including graphical elements that describe various attributes of the given sound including the magnitude, directionality, source, and threat level. Where the source of the given sound is moving, the visual representation shifts to illustrate the movement.

20 Claims, 9 Drawing Sheets

MIXED REALITY SENSOR SUITE AND INTERFACE FOR PHYSICAL REGION ENHANCEMENT

CROSS-REFERENCE TO RELATED APPLICATION

The present disclosure claims benefit of priority under 35 U.S.C. § 119(e) of U.S. Provisional Patent Application Ser. No. 62/685,841, titled "Mixed Reality Sensor Suite and Interface for Physical Region Enhancement," which was filed on Jun. 15, 2018. The entire contents of this priority document are incorporated by reference into the present disclosure.

TECHNICAL FIELD

The present disclosure relates to mixed reality systems in general, and more particularly, to augmented reality systems that provide environmental information to a user.

BACKGROUND

Virtual reality (VR) and augmented reality (AR) environments are generated by computer data simulation. Virtual content can immerse a user in a simulated environment through the use of wearing a near to eye display (NED). The NED embodies a transparent display element that allows virtual content to be displayed for a user to experience through visual perception, auditory detection or tactical interaction.

VR and AR systems provide users with entertaining, immersive three-dimensional (3D) virtual environments in which they can visually (and sometimes audibly) experience things they might not normally experience in real life.

SUMMARY

The present disclosure is generally directed to the analysis of audio data and the presentation of information based on the analysis. More specifically, the present disclosure is directed to the analysis of audio data to determine a location and/or classification of source(s) of sound(s) described by the audio data, and the presentation in a display device of graphic element(s) that indicate the location of the source(s) relative to the display device and/or the classification of the source(s).

Embodiments of the present disclosure include a computer-implemented method that performs the following operations: receiving audio data collected by at least one audio input device, the audio data describing one or more sounds originating from a source in proximity to a display device; analyzing the audio data to determine a location of the source of the one or more sounds relative to the display device; and presenting, through the display device, a graphic element that indicates the source of the one or more sounds at the location relative to the display device.

Embodiments of the present disclosure can also optionally include one or more of the following aspects: the at least one audio input device includes one or more of a microphone and a peripheral sensor device; the audio data describes at least one sound at a frequency that is outside a range of frequencies audible to humans; analyzing the audio data includes filtering the audio data to modulate or remove one or more repeated sounds; analyzing the audio data includes determining a classification of the source of the one or more sounds; the graphic element that is presented through the display device includes the classification of the source; determining the classification of the source includes comparing the audio data to a plurality of sounds having previously determined classifications; the classification is based at least partly on a distance between the source and the display device, the distance determined through the analyzing of the audio data; analyzing the audio data includes determining a direction of movement of the source relative to the display device; the graphic element that is presented through the display device indicates the direction of movement; the display device is a near to eye display (NED); and/or the operations further include transmitting, to at least one other display device, a signal that includes information describing the source, wherein the signal causes each of the at least one other display device to present a respective graphic element that indicates the source of the one or more sounds at a respective location relative to the respective other display device.

Embodiments of the present disclosure also include a display system configured to perform operations described herein. Embodiments of the present disclosure also include memory (e.g., computer-readable storage media) that stores instructions that are executable perform operations described herein.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment," "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Virtual reality (VR) and augmented reality (AR) systems disclosed herein can include a display which presents computer-generated imagery to a user. In some embodiments, the display systems are wearable, which may advantageously provide a more immersive VR or AR experience.

The techniques and systems introduced here are meant to provide sensory information regarding a user's environment (e.g., audio) to a user through a near-to-eye display (NED). The system can incorporate a suite of sensors to take in sensory information (e.g., audio) and a transparent display to display the sensory information to the user. The device can also connect to another sensory device, such as the Tactical Communication and Protective System (TCAPS) to collect similar information. The sensory information received from a sensory device can include, but is not limited to, multi-channel audio, video in visible light or another portion of the electromagnetic spectrum (such as infrared).

After collecting the sensory information, the device analyzes the input to compute actionable data from the relevant characteristics of the sensory information. The actionable data may include the probability of threat of a given source of sensory data, directionality and/or origin of audio, and location of objects of interest. Finally, the sensory information is displayed graphically through a NED.

Figure 1:
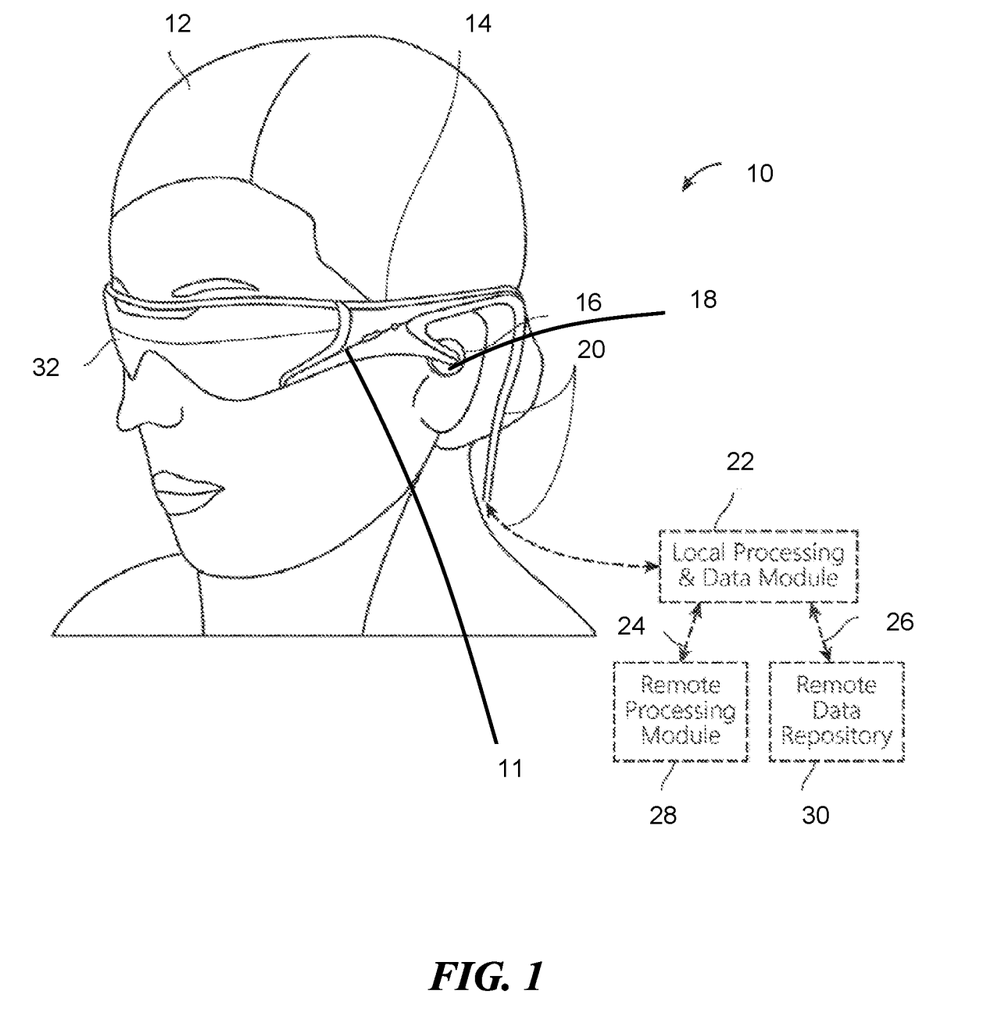
FIG. 1 illustrates an example of a mixed reality system worn by a user.

FIG. 1 illustrates an example of a mixed reality system (MR system) 10 worn by user 12. The MR system 10 includes a frame 14, microphone 16, speaker 18, wired or wireless communication 20, various mechanical and electronic modules and systems (22, 28, and 30) to support the functioning of the MR system 10, and display 32. The MR system 10 makes use of audio input from at least two microphones 16, positioned at either side of the user's head or body (e.g., over the wearer's ears, at either shoulder, or another body mounted location that enables sound directionality). The display 32 may be physically coupled to a frame 14, which is wearable by user 12 and which is configured to position the display 32 in front of the eyes of the user 12. In some embodiments, a speaker 18 and microphone 16 are physically coupled to the frame 14 and positioned adjacent to the ear canal of the user 12. In other embodiments, the speaker 18 and microphone 16 are co-located and in other embodiments, they are not. In other embodiments, the microphone 16 is separate from the frame 14 and supplies input to the NED 11. The display 32 is operatively coupled, such as by wired or wireless connection 20, to a local data processing module 22 which may be mounted in a variety of configurations, such as fixedly attached to the frame 14, affixed to a helmet or hat worn by the user 12, or fixedly attached by a belt-coupling configuration worn by the user 12, or can otherwise be removably attached to the user 12.

In some embodiments, the remote processing module 28 may include one or more processors configured to analyze and process data (e.g., sensory data and/or audio information). In some embodiments, the remote data repository 30 may comprise a digital data storage facility, which can be available through the internet or other network configurations. In other embodiments, all data is stored and all computations are performed in the local processing and data module 22, allowing fully autonomous use. In other embodiments, at least some processing and storage can be done on the remote processing module 28. Network transceivers 24, 26 enable communication through the internet or other network configurations to the remote processing module 28.

In some embodiments, the local processing and data module 22 may include a processor, as well as digital memory, such as non-volatile memory (e.g., flash memory), both of which can be utilized to assist the processing and storing of data. The local processing and data module 22 may also store data from sensory devices such as Tactical Communication and Protective System (TCAPS), microphone 16, speaker 18, image capture devices (e.g., cameras), GPS units and other sensory devices. The local processing and data module 22 can be operatively coupled by communication links 24, 26, such as by wired or wireless communication links, to the remote processing module 28 and remote data repository 30. Remote modules 28, 30 become a resource to the local processing and data module 22 due to this connection via wired or wireless links 24, 26.

In some embodiments, NED 11 can be configured to take input from other sensory devices such as TCAPS. For example, TCAPS can be electronically coupled, through a wired or wireless communication, to NED 11 thus eliminating the need for redundant functional elements on NED 11.

In some embodiments, the computer-generated imagery provided via the display 32 can create the impression of being three-dimensional (3D). 3D imagery can be displayed, for example, by presenting stereoscopic imagery to the user. In some conventional systems, such imagery can include separate images of a scene or object from slightly different perspectives. The separate images can be presented to the user's right eye or left eye, respectively, thus simulating binocular vision and having an associated depth perception for each eye.

In some embodiments, a set of one speaker 18 and one microphone 16 are physically connected to the left ear canal and another set is physically connected to the right ear canal of the user 12, creating two channels of input. The direction and location of the audio input relative to a position of a user is determined by a comparison of audio features between the two-channels of input. Examples of audio features are time lag, wavelength and tone.

Time lag helps determine direction and location because, for example, if a sound arrives at an angle to the right or left of the user's 12 face, the sound does not reach both ears at the same time. Sound is staggered between ears because the sound waves travel a longer distance before reaching the left microphone 16. The comparative discrepancy between the audio input arriving at the left and right microphones 16 enable the MR system 10 to determine directionality of the audio input. In some embodiments, the local processing and data module 22 registers the time lag and inform the user 12 of the location of the original sound. In other embodiments, the remote processing module 28, separately or in combination with the local processing and data module 22, can determine directionality and origin of sound.

Wavelength is another factor that helps to determine the sound origin, particularly with treble sounds. Sounds can be separated into high bandwidth and low bandwidth frequencies. Treble sounds are indicative of high bandwidth frequencies and thus can be differentiated from low or base bandwidth noises. In such situations, the head of a user 12 functions as a filter and prevents sounds from traveling around the head to the opposite ear. In some embodiments, local processing and data module 22 can register and process the variation in sound between the two-channels of input. In other embodiments, the remote processing module 28, separately or in combination with local processing and data module 22, can register and process the difference in sounds between the two-channels of input.

Tone can help determine the location of sound in situations where there is no time lag between the ears (e.g., when the sound comes from above, below or symmetrically in front of the face). Tone can be recognized by vibration regularity. For example, a simple tone has only one frequency, with varying amplitude. A complex tone, conversely, can have multiple frequencies. In some embodiments, local processing and data module 22 can register and process the tone. In other embodiments, the remote processing module 28, separately or in combination with local processing and data module 22, can register and process the tone.

Figure 2:
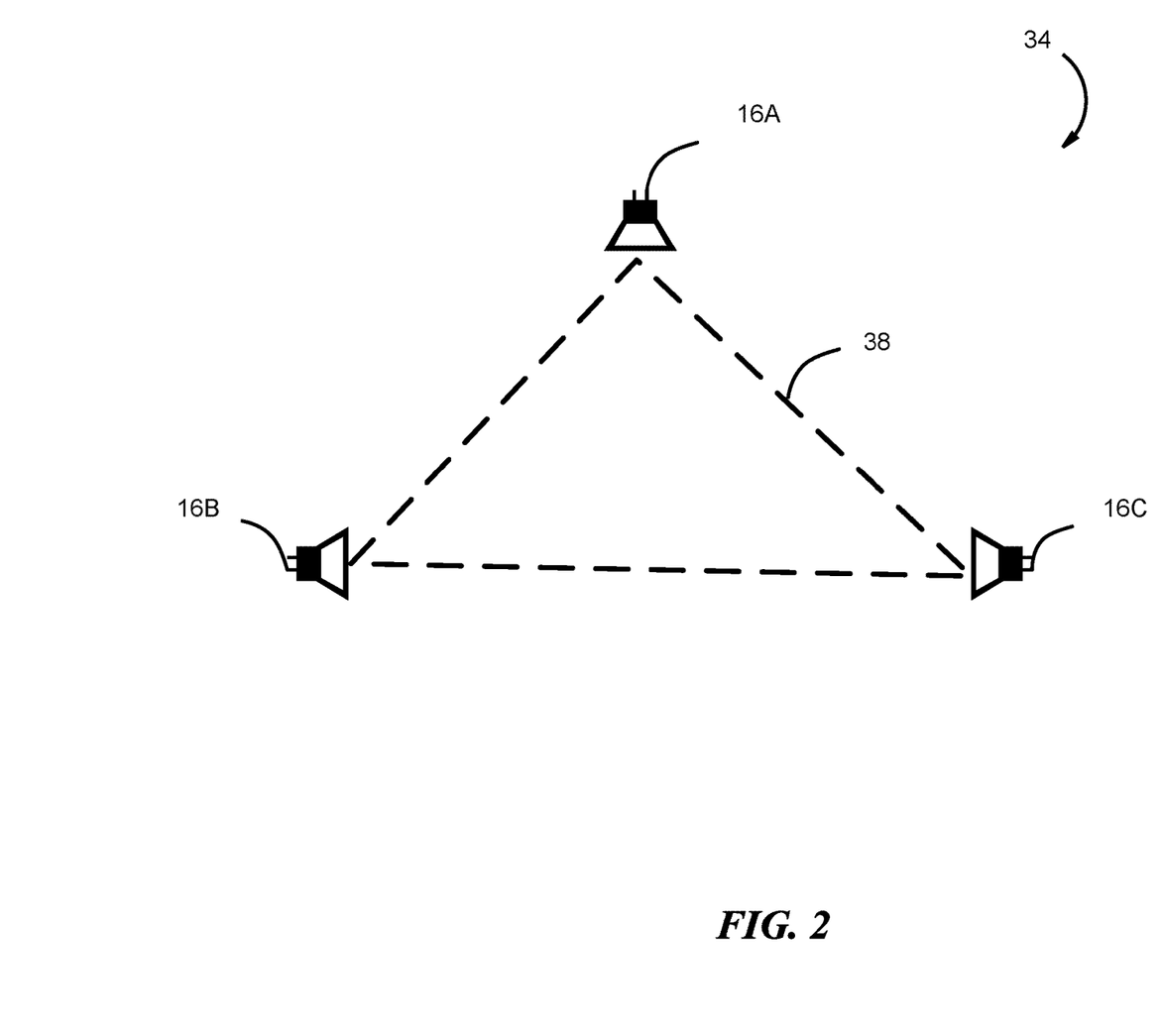
FIG. 2 illustrates that microphones within a mixed reality system can communicate with each other.

FIG. 2 depicts three microphones 16 which are wired or wirelessly connected by link 38. Microphones 16 can be operatively coupled to MR system 10, physically coupled to the frame 14, affixed to the user's 12 body, electronically coupled to a speaker 18 or coupled to other areas which can help determine directionality of a sound. In some embodiments, a set of multiple microphones 16A-C are included on each side of the user 12's head/body. For example, the set could include three microphones per side of a user which are positioned in order to determine the relative height and direction of the audio input based on a single side. The distance between each microphone 16A-C is known; thus, received audio input is compared (e.g., time lag, wavelength and tone) amongst each of the microphones 16A-C in order to calculate whether the sound comes from the front or behind, and above or below. Each microphone receives a different sound than other microphones in the set. Processing modules 22, 28 are thus able to accurately determine the direction and location of a sound. The use of more microphones increases the accuracy of the system.

In some embodiments, microphone 16 can be implemented mechanically such as by an acoustic resonator (e.g., tuning rod). An acoustic resonator vibrates in the same frequency as received audio signals. Vibration from the acoustic resonator can then be processed as audio input by one or both of local processing and data module 22 or remote processing module 28.

Figure 3:
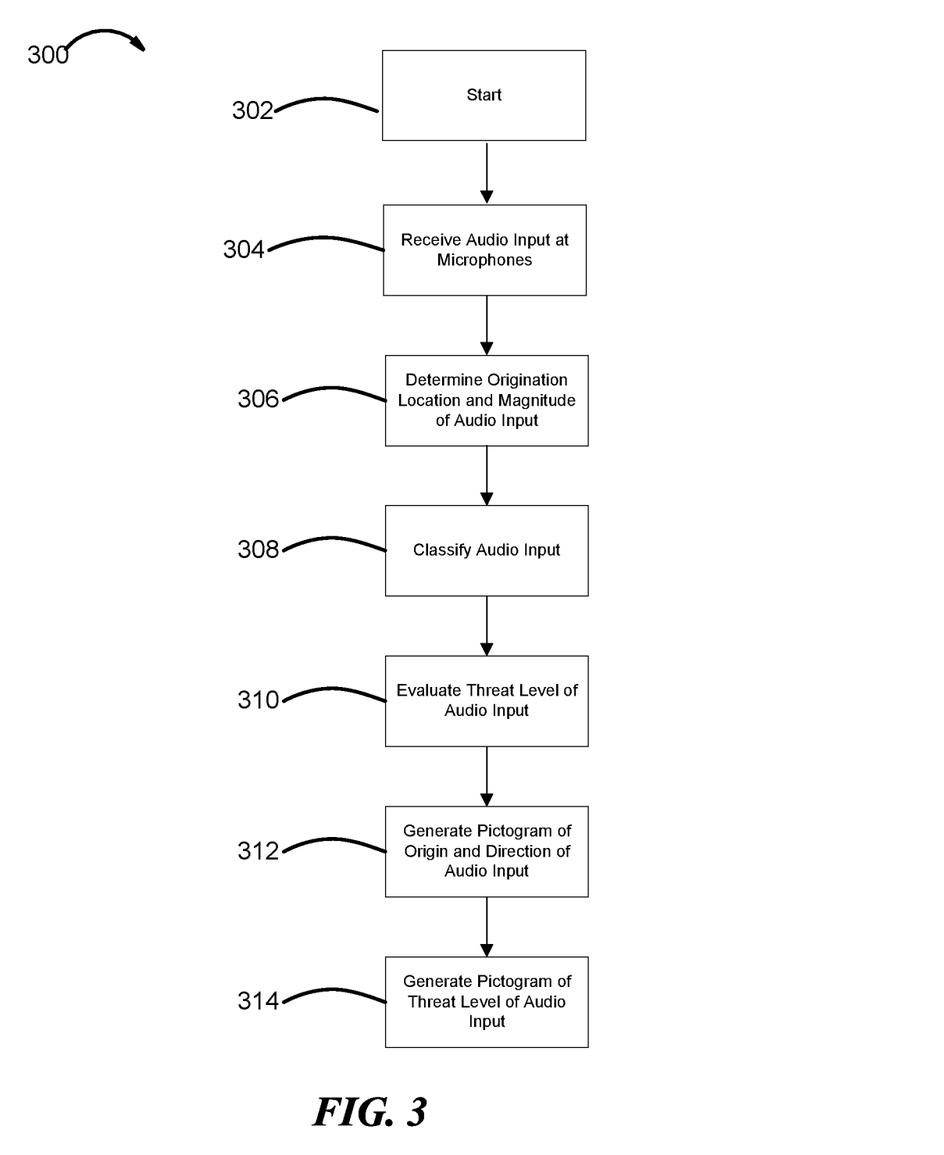
FIG. 3 is a flowchart of the data analysis pipeline.

FIG. 3 shows the general flow diagram of a data processing pipeline 300. In step 302, the user activates the MR system 10. The user can activate the MR system 10 by using a button, switch, or other operative control element.

In step 304, the microphones 16 receive an audio input. In typical cases, the audio input from each microphone includes wavelength and amplitude. In some embodiments, the audio input could be received from a peripheral sensory device such as TCAPS. The audio input can also include audio that is outside the range of frequencies that is audible to humans.

Additionally, the MR system 10 is capable of sound modulation to filter out repeated sound waves. Since a user 12 may receive sound waves from all directions, the user likely receives both direct and reflected sound waves originating from the same source. However, the reflected sound waves can be modulated or removed from the audio data. Modulation or removal of the repeated sound waves can be done by analyzing the audio features to recognize the time lag between the original sound and the repeated sound. Thereby, the processing modules 22, 28 can remove the reflected sound.

In step 306, the processing modules 22, 28 determines the origination location and magnitude of the audio input. To do so, the processing modules 22, 28 can use pre-loaded machine learning models to analyze the audio input. For example, the processing modules 22, 28 can use input (e.g., wavelength, tone, and time lag between microphones) from multiple microphones to determine the origin of a noise. Additionally, other audio characteristics can be determined such as whether a sound is a reflection (e.g., echo).

Audio characteristics are used to compare the audio input to the pre-loaded machine learning model/neural network that includes a plurality of known sounds and the various ways in which those sounds could manifest. The more complete the model, the more sounds can be characterized. The model can identify multiple sounds occurring within a single audio input in order to aid in classifying the audio input.

In some cases, the origin of audio input is a moving object/entity. A continuous audio input can be interpreted to determine whether the origin of the audio input is moving towards or away from the user 12. Determination of whether an audio input is moving towards or away from the user 12 is done by processing modules 22, 28 and recognizing the audio input's Doppler characteristics (e.g., frequency and wavelength). When a sound is moving closer to a user 12 or the user 12 is moving closer to a sound, each successive wave crest is emitted from a position closer to the user 12 than the previous wave. Therefore, each successive wave is received by a set of microphones 16 in slightly less time than the previous wave. Since the time is shorter, the frequency increases. Conversely, when a sound is moving away, each successive wave crest arrives in a slightly longer time period than the previous wave, thus decreasing the frequency. Therefore, the processing module 22, 28 can interpret a variation in arrival time to indicate whether a sound is moving farther away. A graphic representation of whether a sound is moving towards or away from a user 12 can include an arrow pointing to the user 12 or away from user 12 to indicate whether the sound is travelling to or away from the user 12.

In another embodiment, processing modules 22, 28 can use the principles of redshift and blueshift to deduce whether a sound is traveling to or away from user 12. When a sound travels away from the user, redshift occurs because the wavelength of the electromagnetic radiation (e.g., light) of the source increases. The wavelength increases because each successive wave crest takes a slightly longer time to arrive at MR system 10 than the previous wave crest. Conversely, when a sound moves towards the user 12, blueshift occurs because the wavelength of the electromagnetic radiation (e.g., light) of the source decreases. The wavelength decreases because each successive crest takes a slightly shorter time period to arrive at MR system 10 than the previous crest. The MR system 10 can detect changes in electromagnetic radiation by using video data to assess the wavelength.

In step 308, audio input is classified. In some embodiments, audio input can be classified into one or more of categories such as who or what made the noise, by direction of origin, by decibels, by relation to the task being done by the user and by importance to other MR system users. For example, in a war zone, multiple MR system users may be approaching enemy territory together; however, each user may have a different line of sight or be closer to certain sounds. Therefore, noises from guns may be classified as important to the local MR user 12 and to other MR system users as well. A noise from a gun to the left of a user can be classified as information which is to be passed onto nearby MR systems as noise which originated to the left of the user. By passing information of the gun noise (e.g., location, directionality, classification) to other MR system users, they become aware of the situation quickly and can take action accordingly (e.g., take cover, retaliate). Processing modules 22, 28 classify based on, the proximity to the user 12, the wavelength, the frequency, the tone, the environment, and other related characteristics.

In step 310, the processing modules 22, 28 evaluate the threat level of the audio input. The threat level can be based on how the sound was classified using the learned model. For example, audio input can be classified as highly dangerous based on the sound of gunfire or not dangerous based on the sound of children playing. Additionally, the threat level can be based on input from MR systems nearby, the proximity of the sound, or activity performance of the user. In some embodiments, threat level can be a separate category for a sound to be classified under.

In step 312 and 314, the data receives a corresponding graphical representation which can be displayed on display 32. For example, the sound of gun fire from the left causes generation of a graphic of an arrow pointing left and a corresponding threat level graphic (e.g., a gun). In other embodiments, the graphical representation depicting origination, direction and threat level is the same. For example, the sound of gun fire from the left can be depicted by a red vector pointing left, indicating the danger, direction and origin.

To perform the steps of pipeline 300, machine learning models can be based on, for example, one or a combination of linear or logistic regression models, linear discriminant analysis, classification and regression trees, Naïve Bayes algorithms, K-nearest neighbors (KNN) algorithms, learning vector quantization models, bagging and random forest models, boosting and adaboost methods or other related models or algorithms.

In some embodiments, audio and threat level data are classified based on predetermined categories. For example, audio can be classified in a range of danger levels (e.g., from high to low) based on the proximity and type of noise. Proximity of the noise can be determined by using two-channels of input and either the local processing and data module 22 or the remote processing module 28 to assess the audio features (e.g., time lag, wavelength, and tone). The type of noise can be determined by an iterative process of comparing the noise with noises in a database of preloaded sounds to find the best match.

Figure 4:
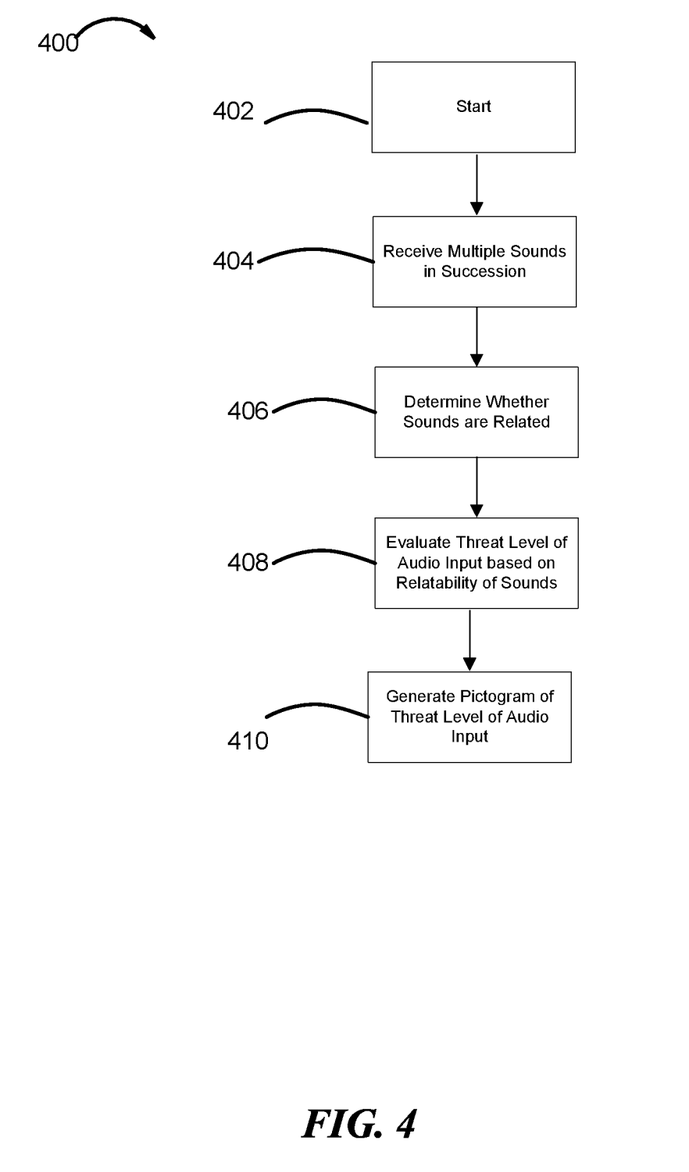
FIG. 4 is a flowchart to determine whether multiple audio inputs are related.

FIG. 4 shows the general flow diagram 400 of how the MR system 10 uses the relatability of audio inputs to evaluate the threat level of the same. In step 402, MR system 10 is initialized. In step 404, multiple audio inputs are received by the system. The multiple audio inputs may be received in quick succession (0-2 seconds), or over a longer period (>2 seconds). In step 406, the relatability of the sounds is determined using machine learning models. Factors such as direction, time between sounds, audio characteristics of the sounds, and relative location of the multiple sounds can help determine their relatability. The source of many sounds is often connected (e.g., a cause and an effect). For example, the sound of a bullet being fired, and the sound of a bullet impacting a target (or missing the target) are related. Another example is the sound of a car starting and then the sound of a car moving. Once relatability of the sounds is determined, in step 408, relatability can become a factor in evaluating the threat level of said sounds. Returning to the example of gun fire, a sound of a gun firing and a corresponding sound of a bullet hitting the ground can be considered to be in relation. If the bullet impacts close to the user 12, the threat level is obviously significantly higher than if the bullet arrives far away from the user 12. Another example can be if there are successive sounds of guns firing, which can be seen as a high threat level.

In step 410, the device displays the graphical representation of the threat level of the audio input. The graphical representation can vary (e.g., order and location of display of varied audio inputs) based on, for example, user preferences or machine learning models. In some embodiments, the user 12 can elect preferences such as to give priority to certain information (e.g., direction or threat level). An option to elect preferences may be presented to the user 12 before initializing the MR system 10. The preferences may include an option to give priority to certain classifications over others. For example, a user in a military zone may want the indication of gun fire to take up 30% of the screen, whereas less threatening indications use 10% of the screen. In other situations, the user 12 may need to encircle an enemy within crosshairs, thus crosshairs may take 50% of the screen.

In other embodiments, machine learning models can prioritize importance based on, for example, the user 12's environment, past preferences, or type of audio. Moreover, the MR system 10, can deduce the user 12's location from input from a GPS and thus change the display to show pertinent information. For example, if the user 12 is in a dense forest, sounds of predators may be of high importance. In other embodiments, the user 12's past preferences may be an indication of how to adapt the display. For example, if the user 12 usually prioritizes threat level when using the MR system 10 in the dark, then the machine learning models learn to prioritize display of threat level as a pre-set preference.

Additionally, the graphical representation can vary based on different kinds of sounds. The graphical representation can vary based on user pertinence. For example, the location of where a bullet impacted the ground is not as significant as to the location of the gunman. Therefore, the MR system 10 may only display a single vector showing the location of the gun. In other embodiments, the MR system 10 can show multiple vectors which point to related sounds. In the same example as the gun firing a bullet, the MR system 10 may display two vectors. One that points to the gun origin and another that points to the location of impact. Both these vectors can be similarly colored to indicate the relation of the event and sound.

In some embodiments, NED 11 can incorporate other sensory devices such as TCAPS, a camera (e.g., thermal camera, depth camera), heart rate sensor, GPS, accuracy assist, rapid target acquisition, and other devices which can be added to help a user in particular situations. For example, a soldier may benefit from an accuracy assist camera that quickly focuses on a target. Thus, NED 11 can incorporate a moving graphic that encircles an enemy (e.g., crosshair). A soldier may also benefit from a heart rate sensor to alert oneself when a break is necessary. NED 11 is able to display a heart pulse graphic to indicate the user's 12 corresponding heart rate.

Additionally, different sensory devices may be needed based on the rank of a solider. For example, a foot solider may need to maximize sensory assistance devices to be aware of the surroundings. A sniper, on the other hand, may need auditory assistance to locate a target while lowering the noise produced by firing a gun. A general, may need communication assistance to be able to talk to all the soldiers and assistance in guiding soldiers in a strategic manner. User-specific needs can be achieved by, for example, prioritizing the display to show only what is crucial to the specific user. In another example, the MR system 10 could have a pre-set user interface. Thus, the user 12 need only select which profile is preferred before operating the MR system 10.

Figure 5:
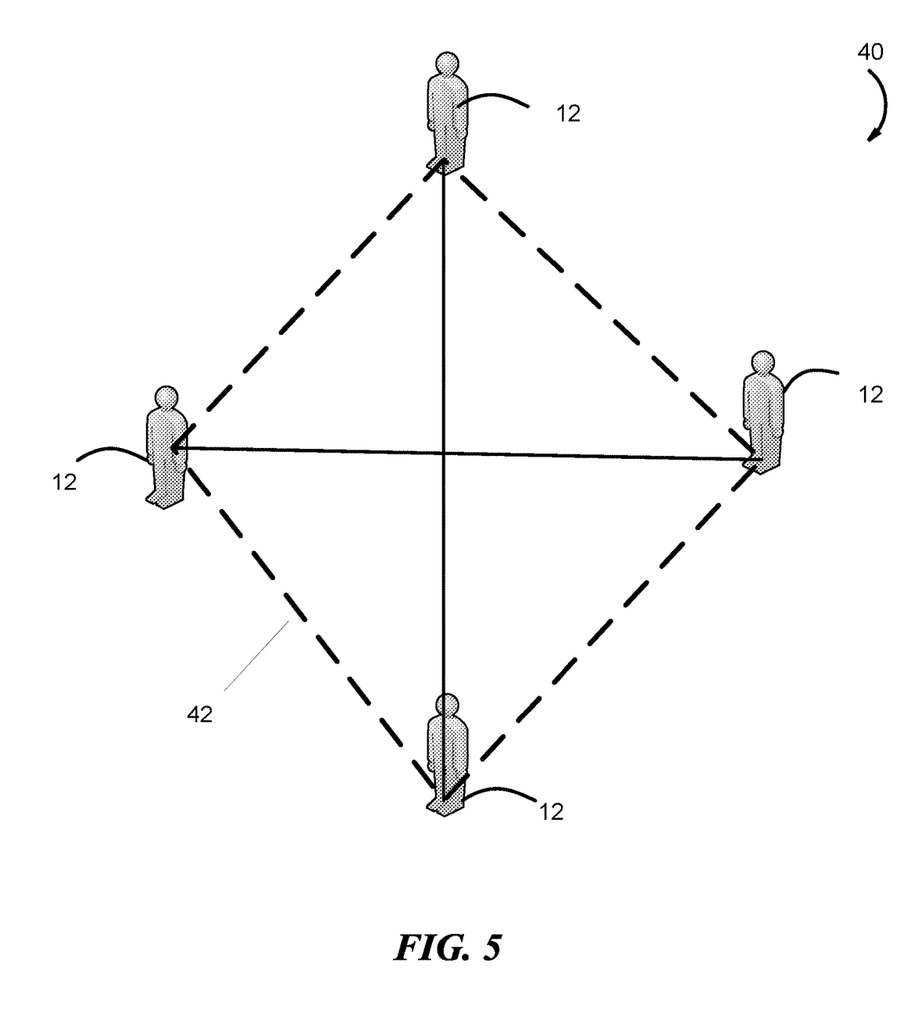
FIG. 5 illustrates that two users wearing near-to-eye displays can interact wirelessly with other users wearing similar devices.

FIG. 5 shows several MR system users 12 wirelessly communicating over interface 42 with each other. The interface 42 can be the internet or other network configurations and wired or wireless. The data shared between the MR system users 12 can be audio data, proximity data, threat level data, and other related data. For example, a gunshot heard in the vicinity of all MR system users 12 can be shared with other MR system users 12 to best determine the location, direction and threat level of the noise. In some embodiments, the local processing and data module 22 can process the data collected from the local NED 11 and subsequently pass said data through a communication interface 42 to other NEDs 11.

In another embodiment, the processing modules 22, 28 can remove, ignore, or dampen unthreatening sounds based on information from other MR systems 10. For example, sounds created by friendly MR system users 12 can be removed, ignored or dampened if they don't pose a threat, such as footsteps. Removing, ignoring or dampening a non-threatening sound may allow the user 12 to focus on the sounds which matter (e.g., the sounds which pose a threat). Additionally, the processing modules 22, 28 can remove, ignore or dampen certain sounds based on information from other MR systems 10 by assessing the other MR system's 10 location, recognition and/or classification of similar sounds.

In other embodiments, MR system 10 can deduce whether a sound is not from the original source (e.g., bounced off a wall such as an echo). To deduce whether a sound is not from the original source, the MR system 10, for example, can get input from other MR system 10 users 12 such as video data, or origination data. For example, if one MR system 10 received audio with certain audio features, while another received a similar sound (e.g., similar in frequency and amplitude) but with different audio features, then the sound can be flagged for further analysis. MR system 10 can use audio features of echoes, such as a time delay from the original sound, for analysis. In echoes, the time delay is proportional to the distance to the reflecting surface from the source of the sound and the listener. Thus, a determination of whether the sound was an echo can be done by comparing the audio features of the sound from each MR system. Moreover, the origination location can also be determined by geometric principles (e.g., Pythagorean theorem).

In other embodiments, video data can be used to find the origination location of a sound. For example, if the source of the sound is pointing to a wall, the processing modules 22, 28 can flag a reflected sound as an echo. Next, video data can be used to find the angle of the wall, which can then be used to calculate the original source's location by geometric principles (e.g., Pythagorean theorem).

In other embodiments, previous origination data can be used to predetermine an outcome or the source of the sound. For example, if the source of a sound has been identified as a moving object, when the object moves out of eye-sight but makes a sound, the MR system 10 can identify the source based on the trajectory and speed of the source. In other embodiments, the source may be stationary but the user 12 has the ability to move where the source isn't visible. However, before the user 12 moves, the MR system 10 is able to register audio from the source. Once the user 12 has moved out of sight and the source makes a similar noise, the previous audio data can be matched (e.g., by wavelength, tone, time lag) with the current audio data to indicate the likely source of the sound.

In another embodiment, sound propagation maps (e.g., sonar maps) can be used to find the original source of a sound. There are two types of sound propagation techniques: passive and active. Under passive propagation, the MR system 10 only listens for sounds. Under active propagation, the MR system 10 emits pulses of sounds and listens for echoes, thus can locate objects and formulate their general shape. For example, a MR system 10 can receive a sound and through active sound propagation can detect if the sound came from a wall. Furthermore, the MR system 10 can calculate the angle of the wall and derive the location of the original source using geometric principles (e.g., Pythagorean theorem).

Figure 6:
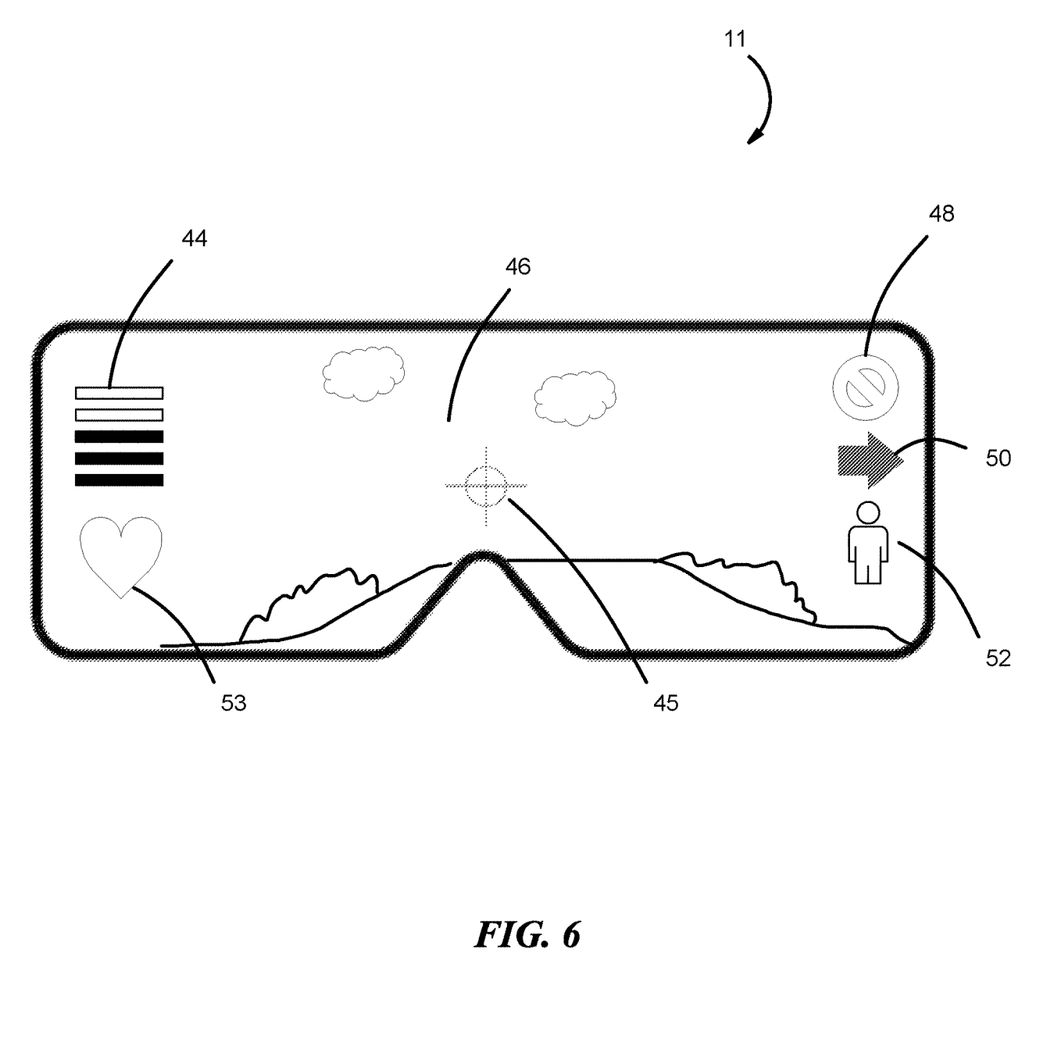
FIG. 6 illustrates a user's view of an augmented reality scene using an example near-to-eye display (NED).

FIG. 6 illustrates an example of a user's view of an augmented reality scene using an example NED 11. NED 11 incorporates a real-world scene 46 with augmented reality graphical representations 44, 45, 46, 48, 50, 52, and 53. Each augmented reality graphic can indicate the level of threat, direction of sound or what produced the sound. For example, the sound bar 44 indicates the level of sound. The danger symbol 48 shows whether the sound is dangerous or not through a variation in color. The arrow 50 shows the direction of the sound. Symbol 52 shows what produced the sound (e.g., in this case a human). Crosshair 45 can assist in encircling a target. Heart symbol 53 can show the user's 12 heart rate by pulsing.

In another embodiment, NED 11 can use different graphics and symbols. For example, if a user of NED 11 is in the middle of a war zone, symbol 52 can be a gun or grenade. Danger symbol 48 can indicate whether the current direction is safe or unsafe based on data collected from communicating with other MR system users 12. The arrow 50 can be a vector that indicates magnitude and direction of the sound. In another embodiment, the graphical representations can be static, while the color changes. For example, the danger symbol 48 can flash red when the user 12 is approaching a dangerous area and then flash green when the user is approaching a safe zone.

Figure 7A:
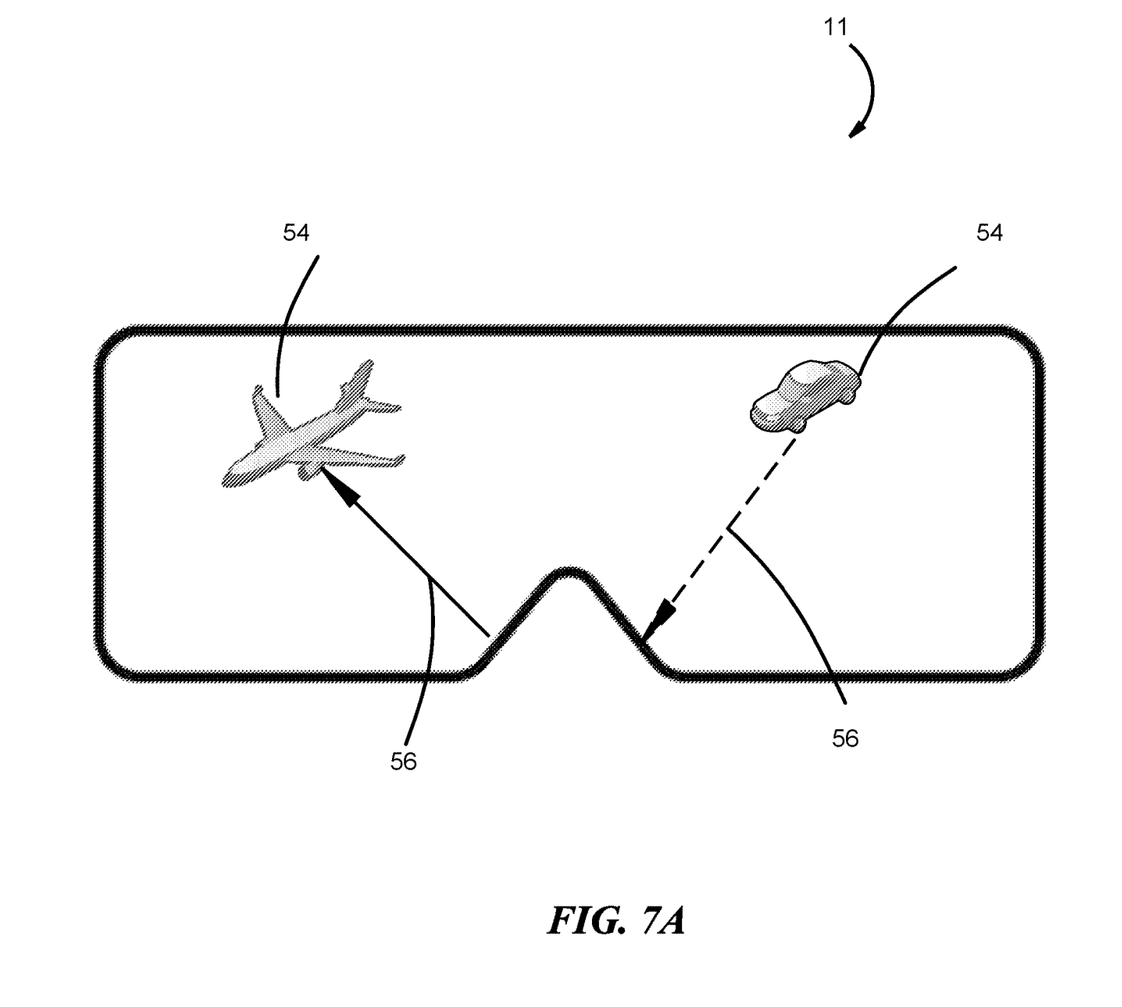
FIG. 7A illustrates a user's view of an augmented reality scene using an example NED with vectors.

FIG. 7A shows another embodiment of the NED 11. The audio inputs 54 are identified by vectors 56. Vectors 56 locate the source of the sound and can vary in thickness, color and or type (e.g., solid, dashed or flashing). The variations can be modified by, for example, the user 12, set by machine learning models or based on the environment. In one embodiment, the thickness may be an indication of decibels, the color may be indication of threat level, and the type may be an indication of the relation to another sound with a similar type of vector. In another embodiment, the vector may change colors based on the environment to ensure there is enough contrast to recognize the AR graphics. For example, if the user 12 is in a forest, a green graphic may not have enough contrast. In such a situation, the MR system 10 can use GPS and video information to analyze the environment and use other colors to increase the contrast.

Figure 7B:
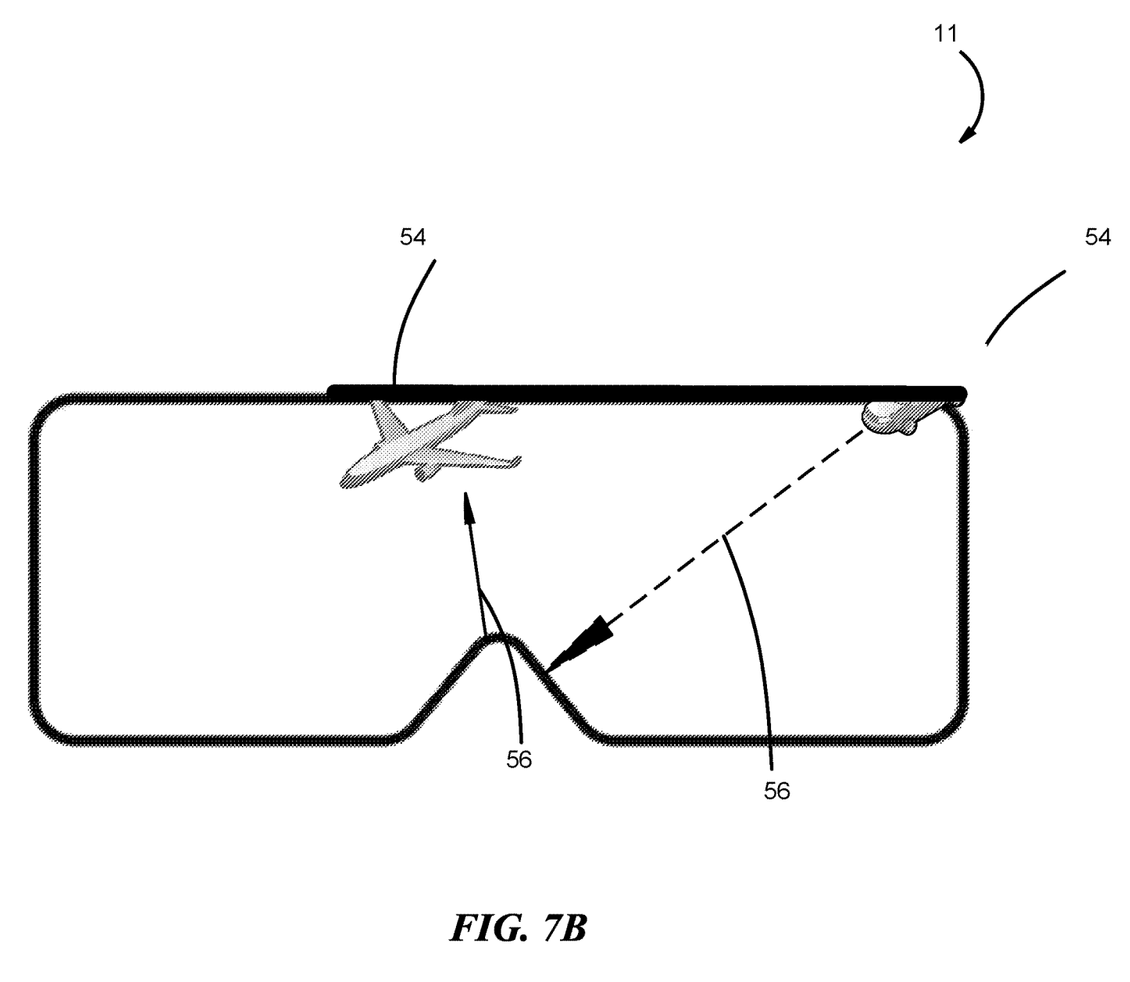
FIG. 7B illustrates a user's view of an augmented reality scene using an example NED with vectors after the user has shifted their viewing angle.

FIG. 7B shows that vectors 56 can maintain directionality (e.g., point to the source of the sound) even while the user 12 turns their head. In FIG. 7B, the user 12 has shifted their view to the right. However, vectors 56 continue to the pointed to the audio inputs 54 in real-time. To maintain directionality, the processing modules 22, 28 can analyze a certain sound for audio features (e.g., wavelength, tone, time lag, amplitude). By analyzing audio features, the location can be deduced as non-stationary, which prompts the display system to adjust the vector accordingly. In another embodiment, when the user 12 may be stationary but the audio input 54 may move (e.g., an airplane), the vector 56 can continue to update in real-time due to differences in audio features and point to the moving audio input 54. For example, the sound of an airplane moving away from the user has a different frequency with each crest due to the soundwaves arriving slightly later with each crest. Therefore, the processing modules 22, 28 can deduce the direction of movement and adjust the displayed vector accordingly.

In another embodiment, vectors 56 can indicate threat level or noise level by appearing thicker or narrower, transitioning from a solid to a dotted type, flashing and/or changing colors. Threat levels can be based on proximity, classification, relation to other noises and information from other MR users 12 (e.g., FIG. 3 and FIG. 4.). Once classified, the graphical representation can vary based on, for example, user 12's preference, machine learning models and the environment. For example, if the user 12 is in the middle of a war zone, the threat level vector 56 may appear to flash in a bright color to garner the full attention of the user 12. In another embodiment, vectors 56 can be incorporated with other graphical representations such as those shown in FIG. 6.

In another embodiment, the display can be optimized to better assist the user 12 to operate efficiently and process information quickly. In some situations, a user 12 may benefit from having only one graphic displayed. For example, when the user 12 wants to encircle an enemy in crosshairs, only the crosshair graphic can be displayed. In other situations, more graphics may be needed because the user 12 wants as much information as possible. For example, if the user 12 is lost in the mountains, gathering information could be crucial to finding a way back to safety. In other embodiments, there can also be nothing displayed because the user 12 needs to focus on the real-world.

The MR system 10 is configurable and adaptable based on, the user 12's preferences, machine learning models or the environment. A configurable and adaptable MR system 10 allows for the user 12 to get crucial information quickly, process information quickly, and to be efficient in stressful situations.

Figure 8:
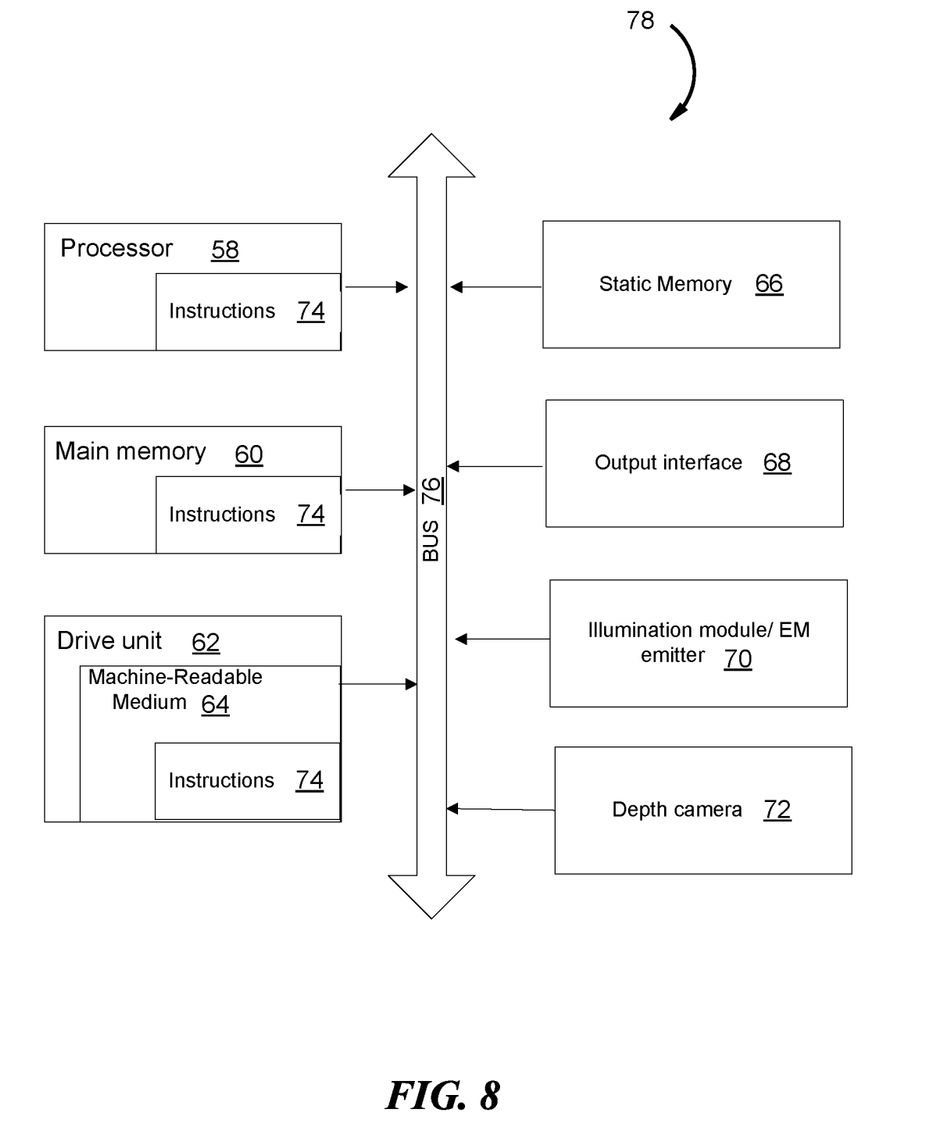
FIG. 8 is a block diagram showing the various functional components of a near-to-eye display.

FIG. 8 depicts a block diagram of various functional components of an MR system 10, according to some embodiments. The functional components of an MR system 10, in FIG. 8, includes one or more instance of each of the following: processor 58, main memory 60, drive unit 62, static memory 66, output interface 68, illumination module/EM emitter 70 and depth camera 72, all electronically coupled together by an interconnect, BUS 76. In some embodiments, the interconnect 76 can be one or more of wired or wireless connectors such as adapter, traces and other conventional connectors.

The drive unit 62 includes a machine-readable medium 64 in which a set of executable instruction is stored i.e., software instructions 74, embodying any one, or all, of the methodologies described herein. The software instructions 74 are also shown to reside, completely or at least partially, within the main memory 60 and/or within the processor 58. The software instructions 74 may further be transmitted or received over a network by means of a network interface device 68.

In contrast to the system 78 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g., a computer. For example, a machine-readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by Internet-enabled or network-enabled devices, servers, or clients and that do not require complex hardware configurations, e.g., requiring cables and complex software configurations, e.g., requiring a consultant to install. For example, embodiments may provide one or more cloud computing solutions that enable users, e.g., users on the go, to access real-time video delivery on such Internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:
1. A method, comprising:
receiving audio data collected by at least one audio input device, the audio data describing one or more sounds originating from a source in proximity to a display device, wherein the display device comprises an image capturing device and is worn by a user who is performing a task;
analyzing the audio data to determine a location of the source of the one or more sounds relative to the display device;
determining one or more graphic characteristics of a graphic element for indication of the source at least by analyzing image information provided at least by the image capturing device for an environment in which the user is located, the one or more characteristics comprising a color of the graphic element; and presenting, through the display device, the graphic element that indicates the source of the one or more sounds at the location relative to the display device.

2. The method of claim 1, wherein the at least one audio input device includes one or more of one or more first microphones located on a first side of the user, one or more second microphones located on a second side of the user, or a peripheral sensor device.

3. The method of claim 1, wherein the audio data describes at least one sound at a frequency that is outside a range of frequencies audible to humans.

4. The method of claim 1, wherein analyzing the audio data includes filtering the audio data to modulate or remove one or more repeated sounds at least by recognizing original sound and repeated sound in the audio data based at least in part upon an analysis of the audio data and further at least by performing sound modulation to filter out the repeated sound, wherein the repeated sound includes reflected sound of the original sound.

5. The method of claim 1, wherein:
analyzing the audio data includes determining a classification of the source of the one or more sounds based at least in part upon a relation between the audio data and the task being performed by the user; and
the graphic element that is presented through the display device includes the classification of the source.

6. The method of claim 5, wherein determining the classification of the source includes comparing the audio data to a plurality of sounds having previously determined classifications.

7. The method of claim 5, wherein the classification is based at least partly on a distance between the source and the display device, the distance determined through an analysis of the audio data.

8. The method of claim 1, wherein:
analyzing the audio data includes determining a direction of movement of the source relative to the display device; and
the graphic element that is presented through the display device indicates the direction of movement.

9. The method of claim 1, wherein the display device is a near to eye display (NED), and the graphic element indicates a level of threat to the user.

10. The method of claim 1, further comprising:
transmitting, to at least one other display device, a signal that includes information describing the source, wherein the signal causes each of the at least one other display device to present a respective graphic element that indicates the source of the one or more sounds at a respective location relative to the at least one other display device.

11. A display system, comprising:
a display device;
at least one processor communicatively coupled to the display device; and
memory communicatively coupled to the at least one processor, the memory storing instructions which, when executed by the at least one processor, cause the at least one processor to perform operations comprising:
receiving audio data collected by at least one audio input device, the audio data describing one or more sounds originating from a source in proximity to the display device, wherein the display device comprises an image capturing device and is worn by a user who is performing a task;
analyzing the audio data to determine a location of the source of the one or more sounds relative to the display device;
determining one or more graphic characteristics of a graphic element for indication of the source at least by analyzing image information provided at least by the image capturing device for an environment in which the user is located, the one or more characteristics comprising a color of the graphic element; and
presenting, through the display device, graphic element that indicates the source of the one or more sounds at the location relative to the display device.

12. The display system of claim 11, wherein the at least one audio input device includes one or more of one or more first microphones on a first side of the user, one or more second microphones on a second side of the user, or a peripheral sensor device.

13. The display system of claim 11, wherein the audio data describes at least one sound at a frequency that is outside a range of frequencies audible to humans.

14. The display system of claim 11, wherein analyzing the audio data includes filtering the audio data to modulate or remove one or more repeated sounds at least by recognizing original sound and repeated sound in the audio data based at least in part upon an analysis of the audio data and further at least by performing sound modulation to filter out the repeated sound, wherein the repeated sound includes reflected sound of the original sound.

15. The display system of claim 11, wherein:
analyzing the audio data includes determining a classification of the source of the one or more sounds based at least in part upon a relation between the audio data and the task being performed by the user; and
the graphic element that is presented through the display device includes the classification of the source.

16. The display system of claim 15, wherein determining the classification of the source includes comparing the audio data to a plurality of sounds having previously determined classifications.

17. The display system of claim 15, wherein the classification is based at least partly on a distance between the source and the display device, the distance determined through an analysis of the audio data.

18. The display system of claim 11, wherein:
analyzing the audio data includes determining a direction of movement of the source relative to the display device; and
the graphic element that is presented through the display device indicates the direction of movement.

19. The display system of claim 11 wherein the display device is a near to eye display (NED), and the graphic element indicates a level of threat to the user.

20. The display system of claim 11, the operations further comprising:
transmitting, to at least one other display device, a signal that includes information describing the source, wherein the signal causes each of the at least one other display device to present a respective graphic element that indicates the source of the one or more sounds at a respective location relative to the at least one other display device.

* * * * *